Fig. 3
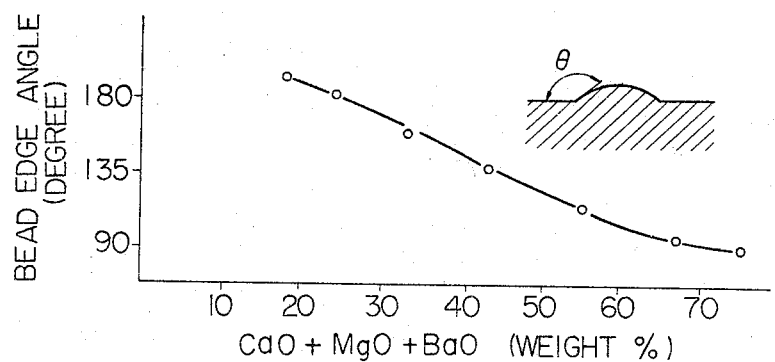
Fig. 4        Fig. 5        Fig. 6
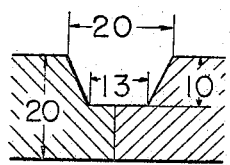 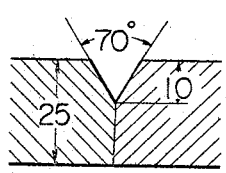 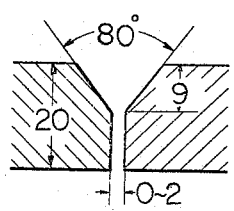
MASAYASU ARIKAWA,
MOTOMI KANO AND  INVENTORS
NAOKI OKUDA United States Patent Office 3,490,960
Patented Jan. 20, 1970

3,490,960
SINTERED FLUX COMPOSITION ESPECIALLY USEFUL IN A SUBMERGED ARC WELDING
Masayasu Arikawa and Motomi Kano, Fujisawa-shi, and Naoki Okuda, Kamakura-shi, Japan, assignors to Kobe Steel Ltd., Kobe, Japan
Filed Nov. 14, 1967, Ser. No. 682,790
Claims priority, application Japan, Nov. 17, 1966, 41/75,713
Int. Cl. B23k 35/34
U.S. Cl. 148—24
4 Claims

ABSTRACT OF THE DISCLOSURE

A sintered welding flux composition especially useful in a submerged arc welding of curved work pieces comprising a metal component and nonmetal components bonded together by means of a suitable bonding agent and sintered and having the bulk specific gravity over 1.0 g./cm.$^3$, said metal component being provided from iron powder in the form of finely ground particles having grain sizes smaller than 20 mesh in the amount range 25–70% by weight based on the weight of the composite flux composition and said nonmetal components being provided from 10–65% by weight of MgO, 29–76% by weight of MgO+CaO+BaO, 45% by weight of $2SiO_2+Al_2O_3$, respectively, based on the weight of the composite nonmetal components and the rest consisting of one member selected from the group including $ZrO_2$, $TiO_2$, MnO, $Na_2O$, $K_2O$ and $CaF_2$.

BACKGROUND OF THE INVENTION

The submerged arc welding method has been principally employed for jointing horizontal or straight work pieces together. For example, even in the ship building industry which the submerged welding method is comparatively frequently employed, under the present circumstances of the industry, the sections of a steel ship where the submerged arc welding method is exclusively employed accounts for only about one-half of the entire structure of the ship which is to be welded and the remaining sections of the ship have to be manually welded. The sections of a steel ship where the submerged arc welding method cannot be easily employed are in most cases those in and adjacent the stern and bow of the vessel and especially the curved steel plates of the hull in these sections. The steel plates in these hull sections generally have sharp curves and furthermore, each of these curved hull plates has its own peculiar degree of curvature different from those of the others. Therefore, the prior art welding flux compositions which have been developed and practically employed for the submerged arc welding of horizontal or straight work pieces have been found impractical for the submerged arc welding of such curved hull plates and if any, the prior art submerged arc welding flux compositions are applicable for welding only hull plates having gentle curvatures smaller than 3°. When the prior art flux compositions are employed for the submerged arc welding of work pieces having curvatures greater than 3°, it has been found that as the welding operation progresses molten slag and/or molten metal drip down from the work pieces which are being welded together resulting in unsatisfactory bead formation.

SUMMARY OF THE INVENTION

The present invention relates to improved sintered flux compositions especially useful in the submerged arc welding of curved work pieces and more particularly to improved sintered flux compositions especially useful in the submerged arc welding of work pieces having curvatures greater than 3° and smaller than 12° which can accelerate the automation of the welding operation thereby to greatly improve the operation by this type of welding method.

One object of the present invention is to provide an improved sintered flux composition especially useful in the submerged arc welding of curved work pieces as well as horizontal and straight work pieces which can effectively eliminate the above-mentioned disadvantages inherent to the prior art flux compositions for the submerged arc welding method.

Another object of the present invention is to provide an improved sintered flux composition especially useful in the submerged arc welding of work pieces having curvatures up to 12° in both the longitudinal and lateral directions thereof while maintaining the conditions for such operation satisfactorily.

According to the present invention, there is provided a sintered flux composition especially useful in a submerged arc welding of curved work pieces comprising a metal component and nonmetal components bonded together by a suitable bonding agent and having a bulk specific gravity over 1.0 g./cm.$^3$, said metal component being provided from iron powder in the form of finely ground particles having grain sizes smaller than 20 mesh in the amount range 25–70% by weight based on the weight of the composite flux composition and said nonmetal components being provided from 10–65% by weight of MgO powder; $CaCO_3$ and/or $BaCO_3$ powders in such amounts that the composite nonmetal components may contain 29–76% by weight of MgO+CaO+BaO; $SiO_2$ and/or $Al_2O_3$ powders in such amounts that the composite nonmetal components may contain 45% by weight of $2SiO_2+Al_2O_3$; respectively, based on the weight of the composite nonmetal components; and the rest consisting of one member or members selected from the group including $ZrO_2$, $TiO_2$, MnO, $Na_2O$, $K_2O$ and $CaF_2$ powders.

In the novel sintered flux composition referred to just above, the iron powder which constitutes the metal component of the flux composition may be partially replaced by ferromanganese, ferrosilicon or ferromolybdenum up to 10% by weight based on the weight of the composite flux composition.

The above and other objects and advantages of the present invention will be more apparent to those skilled in the art from the following description of preferred embodiments of the invention in conjunction with the accompanying drawing.

BRIEF DESCRIPTION OF THE DRAWING

FIG. 3 is a graph which illustrates relationships between composite amounts of CaO, MgO and BaO in the novel sintered flux compositions and the angles of bead edges;

FIGS. 4, 5 and 6 are fragmentary cross-sectional views of work pieces having different groove shapes, respectively, in which metal is to be deposited by the submerged arc welding operations using the novel sintered flux compositions.

PREFERRED EMBODIMENTS OF THE INVENTION

The present invention will be now described in connection with preferred embodiments thereof for illustration purpose only, but not for limitation of the invention.

The reasons for which each of the novel sintered flux compositions especially useful in a submerged arc welding of curved work pieces should comprise the above-mentioned components in their respectively specified proportions are as follows.

In order to improve the weldability of curved steel work pieces by the submerged arc welding method, it is generaly necessary to increase the viscosity of molten slag and molten metal thereby to prevent the slag and metal from flowing down from the work pieces being welded together during the welding operation. For this purpose, it is preferable to lower the temperatures of the slag and the metal of the work pieces in their molten states or increase the cooling rate of the molten metal. Therefore, to attain the said purpose, each of the novel flux compositions contains the additive metal component or components which essentially comprise iron powder within the above-specified amount range. The addition of the metal component or components to the flux composition, which contains the above-mentioned other components within the above-specified amount ranges as well, serves to increase the amount of deposit metal per unit time and also to decrease the latent heat per unit amount of deposit metal as compared with those obtainable by a flux composition having the same composition as that of the novel flux except for the addition of the metal component or components using the same input heat amount. As a result, by the use of the novel flux having the metal component or components added thereto, the cooling rate of the molten metal is greater than that by the use of the non-metal-component type flux. These facts can be clearly seen from FIGS. 1 and 2 of the accompanying drawing.

Figure 1:
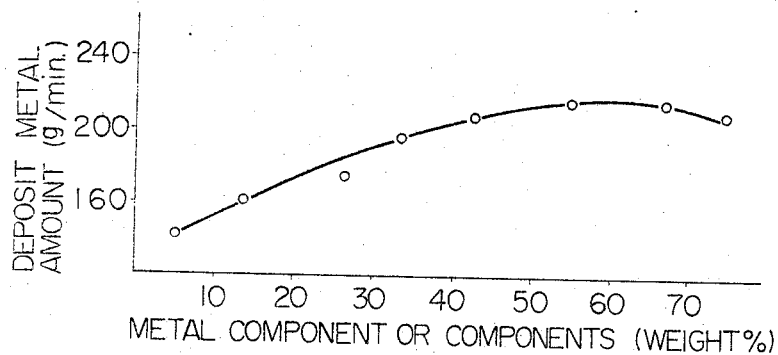
FIG. 1 is a graph which illustrates relationships between the amounts of the metal component or components in the novel sintered flux compositions and the amounts of deposit metals.
Figure 2:
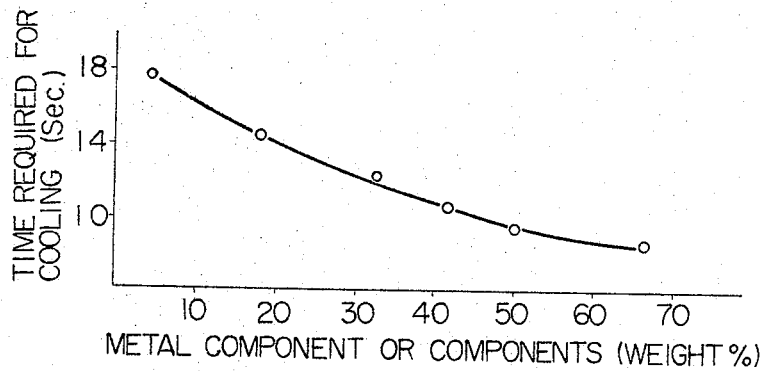
FIG. 2 is a graph which illustrates relationships between the amounts of the metal component or components in the novel sintered flux compositions and the times required for cooling deposit metals.

The reasons for which the blending ratio of the metal component or components in the novel flux composition is specified as 25–70% by weight based on the weight of the composite flux composition are that if the blending ratio of the iron powder particles is smaller than the lower limit of the blending range referred to above, as understood from FIGS. 1 and 2, the cooling rate of the deposit metal will not be significantly increased and that on the other hand, if the blending ratio of the metal component or components in the novel flux composition exceeds the upper limit of the above specified range, however the other components of the flux composition may be adjusted, the weldability and other characteristics of the work pieces will be adversely affected to such a degree that the flux composition may not be practically employed. Furthermore, it should be understood that in preparing any of the novel flux compositions, after the blending of the metal component or components and the other or nonmetal components, the blended components should be sintered so that the obtained flux composition may have a substantially homogeneous structure throughout its body to such a degree that the composition can be practically employed in the submerged arc welding operation thereby to obtain satisfactory results. If the flux composition is employed in a molten state or in a powdery state, the effectiveness of the flux composition will be deteriorated to such a degree that the flux composition can not be practically employed. And as mentioned hereinabove, the metal component or components to be incorporated into any of the novel flux compositions should be finely ground particle-shape material or materials having grain sizes smaller than 20 mesh. If the metal component particles are coarse ones having grain sizes larger than 20 mesh, an arc, which will be formed during a submerged arc welding operation using a flux composition, may be rendered unstable which makes it difficult to obtain a desired smooth bead. The use of such coarse grain size metal component or components in a flux composition is also undesirable in obtaining a flux composition having a homogeneous structure throughout its body.

The nonmetal powders to be employed in preparing any of the novel flux compositions as the nonmetal components essentially comprise basic oxides such as MgO, $CaCO_3$ and $BaCO_3$, and acid oxides such as $SiO_2$ and $Al_2O_3$. The blending ratio of MgO is necessarily within the range of 10–65% by weight based on the weight of the composite nonmetal components and the blending ratio of $CaCO_3$ and/or $BaCO_3$ should be in such amounts that the composite nonmetal components may contain 29–76% by weight of MgO+CaO+BaO based on the weight of the composite nonmetal components. The $CaCO_3$ and $BaCO_3$ are calculated in the forms of oxides such as CaO and BaO. $SiO_2$ and/or $Al_2O_3$ are blended in such amounts that the composite nonmetal components may contain up to 45% by weight of $2SiO_2+Al_2O_3$ based on the weight of the composite nonmetal components.

In any of the novel flux compositions, when the amounts of MgO, $CaCO_3$ and/or $BaCO_3$ are less than the lower limits of the above-specified ranges, respectively, even though the metal component or components are incorporated in the composition within the above specified range, the obtained flux composition will have an undesirably low fluidity. Therefore, it is difficult to form a desired smooth bead on work pieces having curvatures greater than 3°. On the other hand, when the amounts of the MgO, $CaCO_3$ and/or $BaCO_3$ are greater than the upper limits of the above specified ranges, respectively, the obtained flux composition containing the metal component or components within the above-specified range will have an undesirably high melting point which also makes it difficult to form a desired smooth bead on work pieces. When the amounts of $SiO_2$ and/or $Al_2O_3$ are greater than the upper limits of the above specified ranges, respectively, in any of the novel flux compositions, it is also difficult to obtain a satisfactory bead.

Any flux composition to be used in the submerged arc welding of curved work pieces is required to form slag in such a manner during the time the curved surfaces of the work pieces are being welded that the slag may not give the so-called "lean horse" configuration to the obtained bead (the bead has not a desired rounded cross-section configuration, but the opposite edges of the bead are lean with the lofty center ledge).

In order to prevent occurrence of the "lean horse" phenomenon, it is necessary to form a bead on work pieces by depositing a sufficient amount of excess metal thereon and also to form such a bead with the opposite edges having a relatively narrow width. For the former purpose, it is very desirable to add a metal powder or powders to the flux composition in a given amount, and for the latter purpose, it is desirable to form the opposite edges of a bead with an angle $\theta$ up to 170° which is the permissible upper limit for the angle $\theta$ of the bead edges thereby to prevent occurrence of under-cuts in the bead. In order to give the bead edges such an angle, the composite amount of the CaO+MgO+BaO in the nonmetal components of a flux composition must be greater than 29% by weight based on the weight of the composite nonmental components as seen in FIG. 3. Furthermore, in order to prevent formation of any undesirably sharp-angled bead edges which will inevitably tend to trap slag in the bead, the combined amount of CaO+MgO+BaO in the nonmetal components must be limited to amounts smaller than 76% by weight based on the weight of the composite nonmetal components.

Furthermore, in the case of the submerged arc welding of work pieces having sloped surfaces, in order to obtain a bead having a smoothly rounded surface without the excessively lofty center portion, it is also necessary to form slag in such a manner that the slag may have a high viscosity and a high surface tension whereby deposit metal may be effectively prevented from flowing down from the work pieces. However, if the viscosity of such slag is excessively high, the formed bead may frequently have an uneven height and or a locally protruded surface due to variation in the characteristic of an arc to be generated which makes it difficult to obtain a desired uniform configuration bead. The components in any of the flux compositions which have great influences upon the viscosity of slag are basic oxides such as MgO, CaCO₃ and BaCO₃, and acid oxides such as SiO₂ and Al₂O₃, but when these components are maintained within the above-specified ranges, respectively, satisfactory results may be obtained.

Furthermore, if desired or necessary, $CaF_2$ may be added to any of the novel flux compositions so that the viscosity of slag may be effectively adjusted. Since $CaF_2$ generally tends to decrease the viscosity of the slag, this additive component is preferably to be incorporated into the flux composition in amounts smaller than 25% by weight based on the weight of the composite flux composition.

It has been found that when a flux composition has a comparatively great bulk specific gravity and accordingly, the flux composition has a high molten metal and slag retention capability, the flux composition may exhibit remarkable advantages in welding the sloped surfaces of work pieces. In order to maintain a molten metal puddle in a suitable state so as to obtain a desired bead shape, according to the present invention, it is essential that any of the flux compositions has a bulk specific gravity over 1.0 g./cm.³. The advantages of the novel flux compositions for the submerged arc welding over the comparative prior art flux compositions will be described in connection with specific examples hereinbelow.

Examples of the novel flux compositions are given in the following Table 1 and in this Table the amounts of the components given therein are by weight percentages based on the weight of the composite flux compositions as 100%, respectively.

TABLE 1

| Flux composition number | 1 | 2 | 3 | 4 |
|---|---|---|---|---|
| Blending amounts of components (by weight percent): | | | | |
| Magnesium oxide | 16.8 | 20.2 | 3.2 | 14.2 |
| Alumina | 3.2 | 7.1 | 1.9 | 2.2 |
| Fluorite | 7.9 | 5.0 | 0.8 | 9.1 |
| Lime stone | 9.2 | 30.3 | 9.1 | |
| Calcium silicate | 1.5 | | | 2.5 |
| Silica sand | 9.2 | | 5.4 | |
| Barium carbonate | | | 1.8 | 7.2 |
| Albite | | | 2.6 | 8.3 |
| Ferrosilicon | 5.2 | 3.2 | 4.6 | 3.2 |
| Ferromanganese | 4.1 | 2.4 | 6.9 | 2.9 |
| Iron powder | 42.1 | 21.4 | 56.4 | 37.2 |
| Water glass | 10.0 | 10.4 | 7.3 | 13.2 |
| Bulk specific gravity (g./cm.³) | 1.31 | 1.12 | 1.46 | 1.27 |

Submerged arc welding operations were conducted on curved work pieces using the flux compositions as shown in the above Table 1 under the welding conditions as shown in the following Table 2. All the welding operations were performed by the so-called single pass process. Through the welding operations it was confirmed that all the novel flux compositions could form beads having excellent appearances and characteristics on work pieces having the various different curvatures as shown in the below given Table 2 by merely selecting the welding conditions suitable for these different flux compositions and curvatures of the work pieces, respectively.

TABLE 2

| Flux composition number | Welding conditions | | | | |
|---|---|---|---|---|---|
| | Longitudinal curvature of work piece (degree) | Lateral curvature of work piece (degree) | Current (ampere) | Voltage (volt) | Speed (cm./min.) |
| 1 | 0 | 0 | 900 | 42 | 35 |
| | 3 | 3 | 750 | 40 | 26 |
| | 7 | 7 | 700 | 34 | 18 |
| | 10 | 10 | 500 | 32 | 10 |
| 2 | 0 | 5 | 900 | 37 | 30 |
| | 5 | 10 | 750 | 35 | 16 |
| | 10 | 10 | 690 | 31 | 12 |
| 3 | 0 | 5 | 700 | 38 | 26 |
| | 7 | 7 | 600 | 35 | 17 |
| | 11 | 9 | 500 | 34 | 10 |
| 4 | 0 | 0 | 900 | 42 | 35 |
| | 3 | 3 | 750 | 40 | 26 |
| | 7 | 7 | 700 | 34 | 18 |
| | 10 | 10 | 500 | 32 | 10 |

Flux compositions Nos. 1 and 4 were employed in the submerged arc welding of work pieces having the groove configuration as shown in FIG. 4. Flux compositions Nos. 2 and 5 were employed in the submerged arc welding of work pieces having the groove configuration as shown in FIG. 5 and flux composition No. 3 was employed in the submerged arc welding of work pieces having the groove configuration as shown in FIG. 6, respectively.

As is clear from the foregoing description, the present invention has provided improved sintered flux compositions especially useful in the submerged arc welding of work pieces having various curvatures which could not be welded by the submerged arc welding method using the conventional flux compositions and by the use of the novel flux compositions the submerged arc welding operations can be performed under very satisfactory conditions. Thus, the present invention has succeeded in extending the application scope for automatic welding by a great extent.

The present disclosure includes that contained in the appended claims, as well as that of the foregoing description. Although this invention has been described in its preferred forms with a certain degree of particularity, it is understood that the present disclosure of the preferred forms has been made only by way of example and that numerous changes in the details of the components of the flux compositions may be resorted to without departing from the spirit and the scope of the invention as hereinafter claimed.

What is claimed is:

1. A sintered flux composition especially useful in a submerged arc welding of curved work pieces comprising a metal component and nonmetal components bonded together by a bonding agent and having a bulk specific gravity over 1.0 g./cm.³, said metal component being iron powder in the form of finely ground particles having grain sizes smaller than 20 mesh in the amount range of 25–70% by weight based on the weight of the composite flux composition and said nonmetal components comprising MgO powder in the amount range of 10–65% by weight based on the weight of said nonmetal components; said composition further comprising $CaCO_3$ and/or $BaCO_3$ powders in such amounts that the composite nonmetal components contain 29 to 76% by weight of MgO+CaO+BaO, based on the weight of the composite nonmetal components; and said composition also comprising $SiO_2$ and/or $Al_2O_3$ powders in such amounts that the composite nonmetal components contain up to 45% by weight of $2SiO_2+Al_2O_3$, based on the weight of the composite nonmetal components, respectively; and the balance consisting of one or more members selected from the group consisting of $ZrO_2$, $TiO_2$, MnO, $Na_2O$, $K_2O$ and $CaF_2$.

2. A sintered flux composition especially useful in a submerged arc welding of work pieces having curvatures as set forth in claim 1, in which said metal component has been partially replaced by ferromanganese powder in the form of finely ground particles having grain sizes smaller than 20 mesh up to the amount 10% by weight based on the weight of the composite flux composition.

3. A sintered flux composition especially useful in a submerged arc welding of work pieces having curvatures as set forth in claim 1, in which said metal component has been partially replaced by ferrosilicon powder in the form of finely ground particles having grain sizes smaller than 20 mesh up to 10% by weight based on the weight of the composite flux composition.

4. A sintered flux composition especially useful in a submerged arc welding of work pieces having curvatures as set forth in claim 1, in which said metal component has been partially replaced by ferromolybdenum in the form of finely ground particles having grain sizes smaller than 20 mesh up to 10% by weight based on the weight of the composite flux composition.

References Cited

UNITED STATES PATENTS

| | | | |
|---|---|---|---|
| 3,023,302 | 2/1962 | Kennedy et al. | 148—26 |
| 3,078,193 | 2/1963 | Jackson | 106—286 |
| 3,192,076 | 6/1965 | Ballass et al. | 148—26 |
| 3,201,292 | 8/1965 | Miltschitzky et al. | 148—26 |
| 3,211,591 | 10/1965 | Miltschitzky et al. | 148—26 |

L. DEWAYNE RUTLEDGE, Primary Examiner

T. R. FRYE, Assistant Examiner

U.S. Cl. X.R.

29—495; 148—26